United States Patent
Fukuda

(10) Patent No.: US 7,406,672 B2
(45) Date of Patent: Jul. 29, 2008

(54) METHOD AND APPARATUS FOR CONSTRUCTING AND OPTIMIZING A SKEW OF A CLOCK TREE

(75) Inventor: Daisuke Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 185 days.

(21) Appl. No.: 11/363,215

(22) Filed: Feb. 28, 2006

(65) Prior Publication Data
US 2007/0106970 A1    May 10, 2007

(30) Foreign Application Priority Data
Nov. 7, 2005    (JP)    ............... 2005-322335

(51) Int. Cl.
*G06F 17/50*    (2006.01)
*G06F 9/45*     (2006.01)

(52) U.S. Cl. .................... 716/6; 716/1; 716/18

(58) Field of Classification Search ...... 716/1, 716/4, 5, 18, 6
See application file for complete search history.

(56) References Cited

U.S. PATENT DOCUMENTS

| | | | | |
|---|---|---|---|---|
| 5,980,092 A | * | 11/1999 | Merryman et al. | 716/6 |
| 6,698,006 B1 | * | 2/2004 | Srinivasan et al. | 716/10 |
| 6,799,310 B2 | * | 9/2004 | Miyamoto | 716/10 |
| 7,257,782 B2 | * | 8/2007 | Ho et al. | 716/2 |

FOREIGN PATENT DOCUMENTS

JP    2004-185466    7/2004

* cited by examiner

*Primary Examiner*—Jack Chiang
*Assistant Examiner*—Nghia M Doan
(74) *Attorney, Agent, or Firm*—Staas & Halsey LLP

(57) ABSTRACT

An apparatus for supporting a design of a circuit including a plurality of elements, comprising: an acquiring unit that acquires a clock tree of the circuit; a constructing unit that constructs, based on the clock tree, a plurality of groups each of which includes a part of elements of same skew; an analyzing unit that performs an analysis of a timing of an inter-group path between two of the groups; and an output unit that outputs a result of the analysis.

9 Claims, 5 Drawing Sheets

METHOD AND APPARATUS FOR CONSTRUCTING AND OPTIMIZING A SKEW OF A CLOCK TREE

CROSS-REFERENCE TO RELATED APPLICATIONS

This application is based upon and claims the benefit of priority from the prior Japanese Patent Application No.2005-322335, filed on Nov. 7, 2005, the entire contents of which are incorporated herein by reference.

BACKGROUND OF THE INVENTION

1. Field of the Invention

The present invention relates to a technology for supporting the design of a large-scale integrated circuit (LSI).

2. Description of the Related Art

Timing design is a process for estimating a circuit delay of an LSI, executing optimization, and verifying that the delay is within a range required for the normal operation of the LSI. Timing design is indispensable for guaranteeing that a fabricated LSI operates normally, and is very important because the timing design includes a large amount of work and accounts for a large percentage of the process steps for designing the LSI. To reduce the time required for designing an LSI, first, facilitating reduction of the number of process steps for the timing design is necessary.

In LSI design in recent years, for the reasons of reduction of power consumption, reuse of modules, etc., restrictions on complicated timing design are often required. For example, reduction of power consumption is generally facilitated by using a low clock frequency for the parts that do not need to operate fast by dividing the original frequency, and by stopping the supply of unnecessary clock by inserting a clock gate. Because one LSI is used for a plurality of devices, a plurality of operation modes each of which having a timing condition different from that of others may be prepared. Therefore, the restriction on the timing design of an LSI often becomes complicated.

For an LSI to operate at a target frequency, two types of timing restrictions, a set-up restriction and a hold restriction need to be complied with. In general, the timing at which a signal transmitted from a flip flop (FF) on the transmitting side arrives at an FF on the receiving side must be after the present clock and before the next clock. The hold restriction and the set-up restriction respectively mean to guarantee that the arrival of a signal occurs after the present clock and that the arrival of a signal occurs before the next clock, and respectively determine the minimum value and the maximum value of propagating time of the signal.

In a conventional common design flow, after the timing restriction between FFs has been derived and a timing optimizing-arrangement has executed assuming that all FFs receive a clock at the same time, a clock tree is constructed such that skews (the difference in clock arrival time between FFs) are respectively minimized.

FIG. 7 is a diagram showing an example of a clock tree. The thick lines indicate clock paths, the thin lines indicate data paths, and "CS" indicates a clock source. When a clock tree 700 is constructed, the skew in a group G constituted of an FF1, an FF3, . . . located at ends of the clock tree that constitutes a clock generating circuit needs to be zero.

A data path DP is a bus that outputs data from the FF1 to an FF2 (for example, a dividing circuit or a clock gate) that is not located at an end of the clock tree. In this case, the skew is adjusted after arrangement and wiring. As a conventional technique that adjusts a skew after arrangement and wiring, Japanese Patent Application Laid-Open No. 2004-185466 can be listed.

When arrangement and wiring are executed and the clock tree 700 is simply constructed after completing logic synthesis, a timing error can be discovered early by performing static timing analysis (STA). Thereby, the clock tree is re-generated by imposing the timing restriction on the FFs and the error can be corrected.

However, in the clock tree 700 shown in FIG. 7, though the FF1 and the FF3 are in the same group, the FF3 starts operating after the FF2 has started operating into which data has been inputted from the FF1 through the data path DP and, therefore, a skew is generated between the FF1 and the FF3. Therefore, due to the presence of the data path DP, a problem has been arisen that compliance with the timing restriction may be difficult.

As described above, when the timing restriction still remains being not complied with after arrangement and wiring, correction must be executed according to an engineering change order (ECO). However, in the correction after arrangement and wiring, a problem has been arisen that the labor of the designers is increased and the time required for designing becomes longer because of the returned design.

As described above, when the clock tree 700 is simply constructed after completing logic synthesis, an STA analysis is performed to detect timing errors. However, in general, an STA analysis covers all the paths. When the timing of some of the FFs has been respectively changed, the STA analysis needs to be performed on all the paths one by one because other paths may also be influenced. Therefore, because an STA analysis is necessary for each correction of the clock timing when the clock tree is constructed after completing logic synthesis, a problem has arisen that the time required for designing becomes longer.

SUMMARY OF THE INVENTION

It is an object of the present invention to at least solve the problems in the conventional technology.

An apparatus according to an aspect of the present invention is an apparatus for supporting a design of a circuit including a plurality of elements. The apparatus includes: an acquiring unit that acquires a clock tree of the circuit; a constructing unit that constructs, based on the clock tree, a plurality of groups each of which includes a part of elements having same skew; an analyzing unit that performs an analysis of a timing of an inter-group path between two of the groups; and an output unit that outputs a result of the analysis.

A method according to another aspect of the present invention is a method for supporting a design of a circuit including a plurality of elements. The method includes: acquiring a clock tree of the circuit; constructing, based on the clock tree, a plurality of groups each of which includes a part of elements of same skew; performing an analysis of a timing of an inter-group path between two of the groups; and outputting a result of the analysis.

A computer-readable recording medium according to still another aspect of the present invention stores a computer program for supporting a design of a circuit including a plurality of elements. The computer program causes a computer to execute: acquiring a clock tree of the circuit; constructing, based on the clock tree, a plurality of groups each of which includes a part of elements of same skew; performing an analysis of a timing of an inter-group path between two of the groups; and outputting a result of the analysis.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention will be described in detail with reference to the accompanying drawings.

Figure 1:
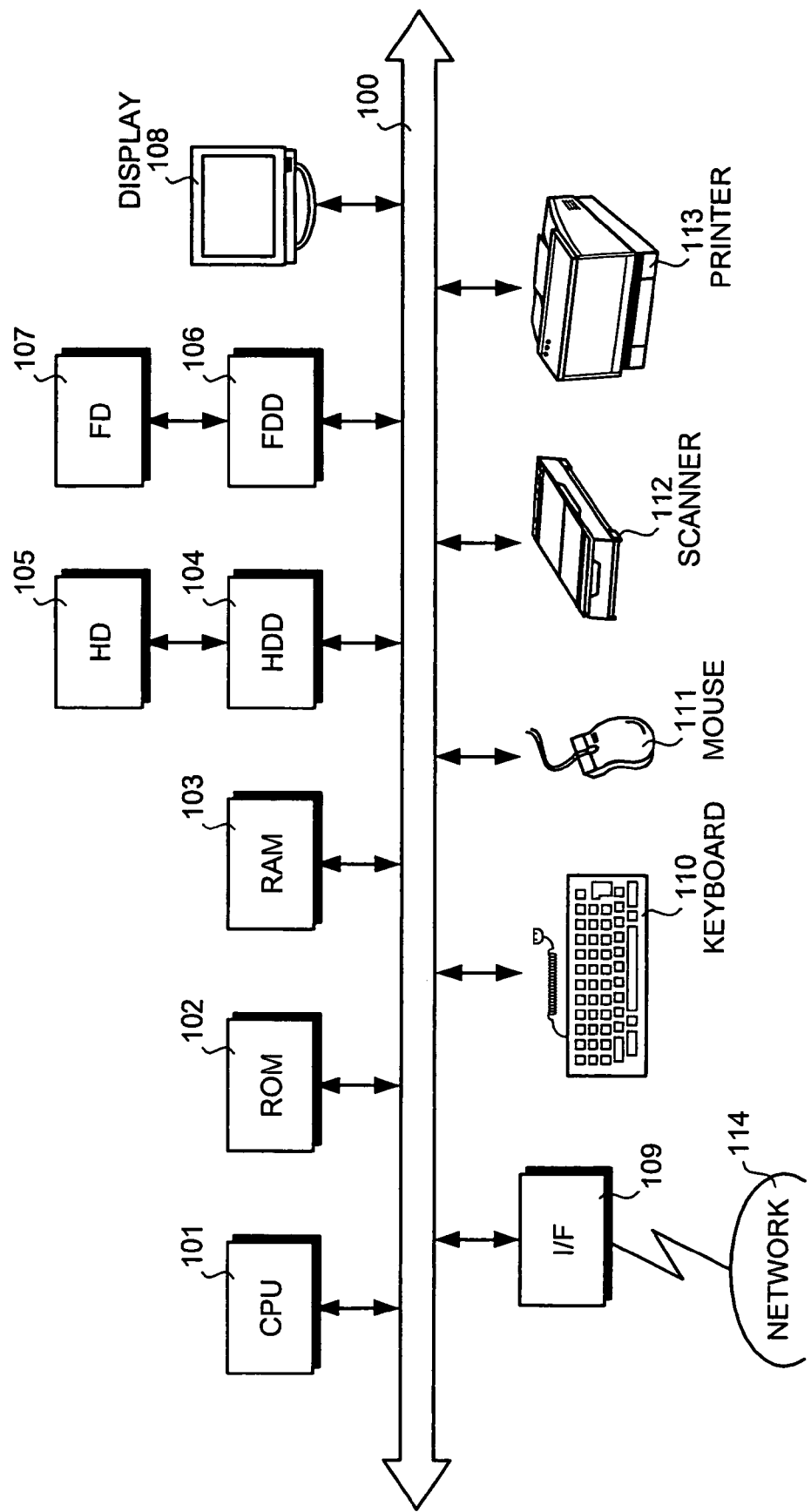
FIG. 1 is a diagram for explaining a hardware configuration of a design supporting apparatus according to an embodiment of the present invention.

FIG. 1 is a diagram for explaining a hardware configuration of a design supporting apparatus according to an embodiment of the present invention.

In FIG. 1, the design supporting apparatus includes a central processing unit (CPU) 101, a read-only memory (ROM) 102, a random-access memory (RAM) 103, a hard disk drive (HDD) 104, a hard disk (HD) 105, a flexible disk drive (FDD) 106, a flexible disk (FD) 107 as an example of a detachable recording medium, a display 108, an interface (I/F) 109, a keyboard 110, a mouse 111, a scanner 112, and a printer 113. Each component is connected with others through a bus 100.

The CPU 101 controls the entire design supporting apparatus. The ROM 102 stores programs such as a boot program. The RAM 103 is used as a work area of the CPU 101. The HDD 104 controls reading/writing of data from/to the HD 105 according to the control of the CPU 101. The HD 105 stores data written into the HD 105 according to the control of the HDD 104.

The FDD 106 controls reading/writing of data from/to the FD 107 according to the control of the CPU 101. The FD 107 stores data written into the FD 107 according to the control of the FDD 106 and causes the design supporting apparatus to read the data stored in the FD 107.

In addition to the FD 107, the detachable recording medium may be a CD-ROM (CD-R, CD-RW), a magneto-optical device (MO), a digital versatile disk (DVD), a memory card, etc. The display 108 displays data such as texts, images, functional information, etc. in addition to a cursor, icons or tool boxes. A CRT, a thin-film transistor (TFT) liquid crystal display, a plasma display, etc. may be employed as this display 108.

The I/F 109 is connected through a communication line with a network 114 such as the Internet and is further connected with another apparatus through this network 114. The I/F 109 administers the interface between the network 114 and the interior and controls input/output of data sent from an external apparatus. As the I/F 109, for example, a modem or an LAN adaptor may be employed.

The keyboard 110 includes keys for inputting letters, numerals, various instructions, etc. and is used for inputting data. Instead, the keyboard 110 may be a touch-panel-type input pad, a ten-keys, etc. The mouse 111 can be used for moving the cursor, selecting an area, or moving or changing the size of a window. The mouse 111 may be a track ball, a joy stick, etc. that also has the functions as a pointing device.

The scanner 112 reads images optically and captures image data into the design supporting apparatus. The scanner 112 may have an OCR function. The printer 113 prints out image data and text data. As the printer 113, for example, a laser printer or an ink-jet printer may be employed.

Figure 2:
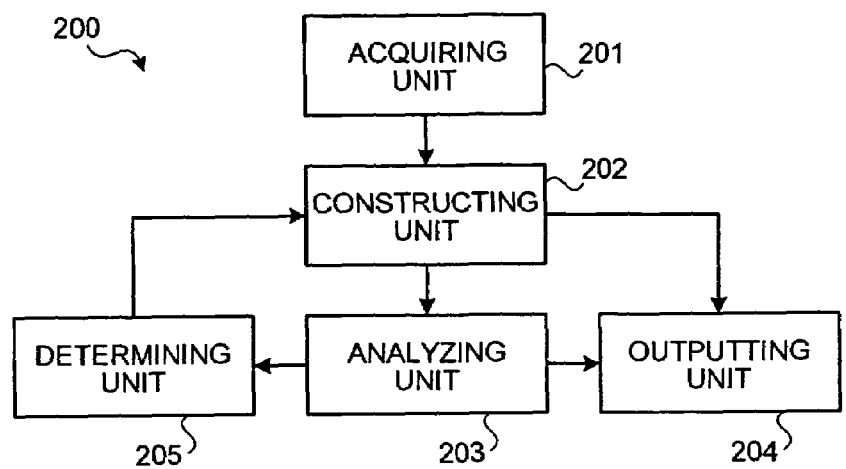
FIG. 2 is a diagram for explaining a functional configuration of the design supporting apparatus.

FIG. 2 is a diagram for explaining a functional configuration of a design supporting apparatus 200 according to the embodiment of the present invention. The design supporting apparatus 200 includes an acquiring unit 201, a constructing unit 202, an analyzing unit 203, an outputting unit 204, and a determining unit 205.

The acquiring unit 201 acquires a clock tree of a circuit (LSI) to be designed. More specifically, for example, the acquiring unit 201 reads circuit information necessary for creating the clock tree such as a net list of the circuit to be designed and a timing restriction file created by a logic synthesis tool, and executes processes for temporary arrangement and temporary wiring. Thereby, the clock tree of the circuit to be designed is created.

Figure 3:
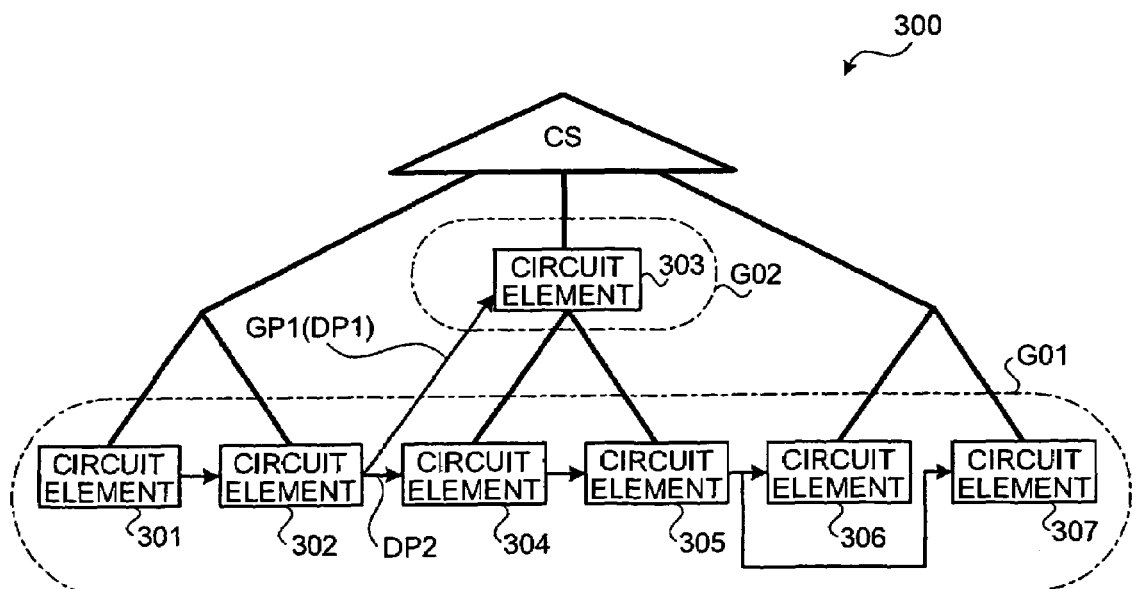
FIG. 3 is a diagram for explaining a clock tree of a circuit to be designed.

FIG. 3 is a diagram for explaining a clock tree 300 of the circuit to be designed. The clock tree 300 includes the clock source CS and a plurality of circuit elements. Each circuit element is a circuit part in the circuit to be designed, that constitutes a buffer, a clock generating circuit, a dividing circuit, a clock gate buffer, etc. and is constituted of, for example, a flip flop (FF), etc. Circuit elements 301, 302, 304 to 307 are the circuit elements located at ends of the clock tree 300. The circuit element 303 is a circuit element located at a non-end.

The circuit elements 301 to 307 are connected directly or indirectly by clock paths (thick lines in FIG. 3) from the clock source CS. Each of the circuit elements 301 to 306 is inputted with a clock signal from the clock source CS through the clock paths. Each of the circuit elements 301 to 307 is connected by data paths (thin arrows in FIG. 3) with other circuit elements. For example, the circuit element 303 on a data path DP1 and the circuit element 304 on a data path DP2 are both inputted with a data signal from the circuit element 302.

The constructing unit 202 constructs a group constituted of the circuit elements having the same skew, based on the clock tree 300 acquired by the acquiring unit 201. The skew in this case is the difference between the circuit elements (FFs) in time at which a clock signal arrives at the circuit element from the clock source. The constructing unit 202 groups the circuit elements into groups that respectively include the circuit elements among which the skew is zero.

For example, the circuit elements 301, 302, 304 to 307 located at the ends of the clock tree 300 are a group of circuits for which the difference between the elements in the time at which a clock signal arrives at the circuit element is zero, that is, the skew is zero between the circuit elements 301, 302, 304 to 307. This group of the circuit elements is represented here as a group G01.

When no circuit element that generates the same skew presents, the construction unit 202 makes a group constituted of only those circuit elements. For example, the circuit element 303 captures a data signal from the circuit element 302 through the data path DP1, and after processing the captured data signal, provides a clock signal to the circuit elements 304 and 305 through the clock paths.

Therefore, the circuit element 303 belongs to a group other than the group G01 because the circuit element 303 has a skew different from those of the other circuit elements 301, 302, 304 to 307. In FIG. 3, no circuit element that has the same skew as that of the circuit element 303 is present. Therefore, the circuit element 303 alone constitutes a group G02.

In this specification, a numeral "y" of the symbol "Gxy" attached to a group represents the type of the group, and a numeral "x" of the symbol "Gxy" represents the number of times of reconstruction described later. For example, the group "G01" is a group constructed by the constructing unit 202 and a group "G11" is a group obtained by reconstructing the group G01.

The grouping by the constructing unit 202 (including reconstruction and new construction) may be automatic grouping as a result of calculating the skews of the circuit elements, and may be grouping by causing the clock tree 300 to be displayed on a display screen on the display 108 and causing grouping by user operation, for example, drag and drop.

Referring back to FIG. 2, the analyzing unit 203 analyzes the timing of the data paths (hereinafter, "inter-group paths") connecting groups constructed by the constructing unit 202 with each other. More specifically, the clock tree shown in FIG. 3 will be described as an example.

The analyzing unit 203 first identifies the data path DP1 connecting the circuit element 302 with the circuit element 303 as an inter-group path GP1 connecting the group G01 with the group G02, and determines only the inter-group path GP1 as the target to be analyzed with the STA analysis. More specifically, whether the inter-group path GP1 is a critical path that causes a delay in the group G01 or the group G02 is analyzed.

As described above, the analyzing unit 203 takes only the inter-group path GP1 as a target for an STA analysis and excludes other data paths from the targets for the STA analysis, thereby facilitating increase of the speed of the analysis process of the STA analysis and reduction of the time required for the STA analysis.

When an inter-group path is determined by the analyzing unit 203 to be a critical path as a result of an analysis, the construction unit 202 reconstructs the groups. More specifically, the constructing unit 202 reconstructs the groups such that circuit elements connected with inter-group paths are excluded from a group that contains those circuit elements. More specifically, for example, in a group connected with an inter-group path, a circuit element connected with an inter-group path and a circuit element at a previous stage of the circuit element are excluded from the group and are used to construct a new group.

For example, when the inter-group path GP1 shown in FIG. 3 does not comply with the timing restriction of group G01 and the inter-group path GP1 is determined to be a critical path, the constructing unit 202 reconstructs a group. That is, when the inter-group path GP1 shown in FIG. 3 is a critical path, the circuit element 302 connected with the inter-group path GP1 and the circuit element 301 at the previous stage of the circuit element 302 are excluded from the group G01 that does not comply with the timing restriction.

Figure 4:
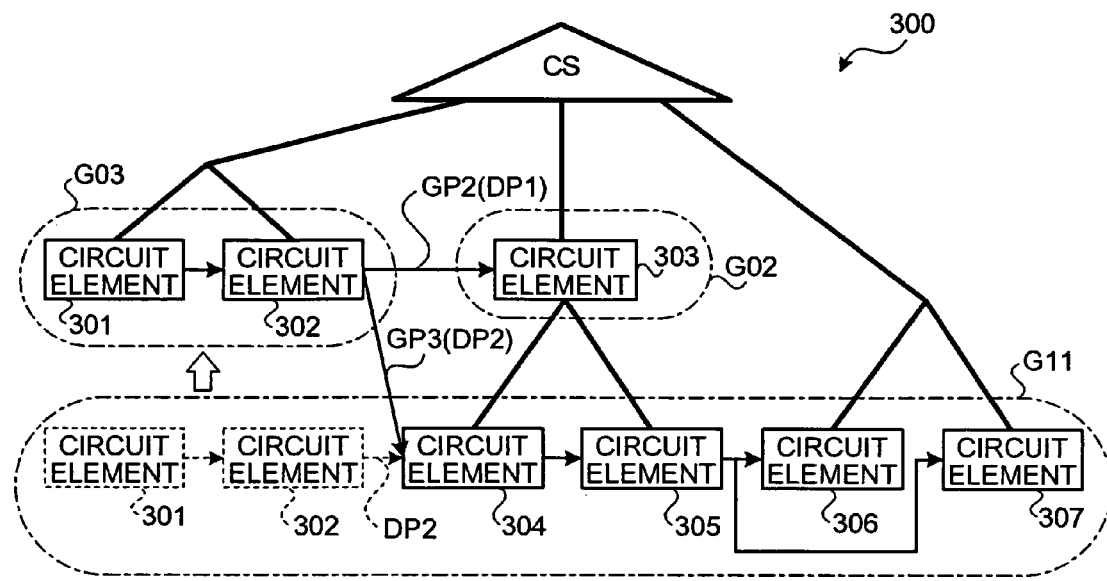
FIG. 4 is a diagram for explaining a reconstruction process of groups.

FIG. 4 is a diagram for explaining a reconstruction process of the groups by the constructing unit 202. The group G11 is a group reconstructed as a result of the exclusion of the circuit elements 301 and 302. The circuit elements 301 and 302 excluded from the group G01 are grouped as a new group G03. By this reconstruction process, the group G11, a group G02, and a group G03 are reconstructed.

In this case, the analyzing unit 203 analyzes the timing of paths between the new group and other groups (hereinafter, "new inter-group paths") constructed by the constructing unit 202. That is, the analyzing unit 203 analyzes the timing of the inter-group paths after the reconstruction. In FIG. 4, for example, the data path DP1 connecting the circuit element 303 in the group G02 with the circuit element 302 in the group G03 is identified to be a new inter-group path GP2. The data path DP2 connecting the circuit element 302 in the group G03 with the circuit element 304 in the group G11 is identified to be a new inter-group path GP3.

An inter-group path between a newly constructed group and a group from which the circuit elements constituting the newly constructed group have been excluded can be excluded from the targets to be analyzed with the STA analysis. For example, the inter-group path GP3 is the data path DP2 that connects the group 03 and the group G01 (which becomes the group G11 after the exclusion) from which the circuit elements 301 and 302 constituting the group G03 have been excluded. That is, the inter-group path GP3 is the data path DP2 between the circuit elements 302 and 304 that have a skew of zero in the group G01. Therefore, because the timing restriction is complied with without any ATA analysis, the inter-group path GP3 may be excluded from the targets for the STA analysis. Thereby, increase of the speed of the analysis process of the STA analysis and reduction of the time necessary for the STA analysis can be facilitated when as many path as possible are excluded from the targets for the analysis after the reconstruction.

Then the timing of the identified inter-group paths GP2 and GP3 is analyzed. More specifically, whether the inter-group paths GP2 and GP3 are critical paths that cause the delay in the group G11, G02, and G03 is analyzed. In this case, the constructing unit 202 reconstructs the groups similarly as above when the inter-group path GP2 or the inter-group path GP3 is determined by the analyzing unit 203 to be a critical path as a result of the analysis.

Referring back to FIG. 2, the outputting unit 204 outputs the result of the analysis of the inter-group paths analyzed by the analyzing unit 203. For example, when the inter-group path GP1 is not a critical path, information indicating this; or a timing restriction file containing the arrival time, etc. of a data signal when the groups G01 and G02 connected with the inter-group path GP1 complies with the timing restriction; are outputted as the result of the analysis.

When the inter-group paths GP2 and GP3 are determined not to be critical paths as a result of the analysis by an STA analysis after reconstruction of the groups as shown in FIG. 4, a timing restriction file in response to this analysis is outputted. Thereby, the content of the compliance with the timing restriction can be verified.

Referring back to FIG. 2, the determining unit 205 determines whether a new group and other groups have the same skew when a new inter-group path is determined by the analyzing unit 203 not to be a critical path as a result of an analysis. More specifically, whether the new group, and other groups other than the group from which the circuit elements in the new group have been excluded, have the same skew is determined.

For example, whether the circuit elements 301 and 302 in the new group G03 shown in FIG. 4, and the circuit element 303 in the different group G02, have the same skew (for example, a skew value: zero) is determined. When the skew that those circuit elements have is determined not to be the same skew, the clock tree 300 constructed finally has the configuration shown in FIG. 4.

The constructing unit 202 merges the new group and other groups based on the result of the determination determined by the determining unit 205. More specifically, when the determining unit 205 determines that those circuit elements have the same skew, the constructing unit 202 merges (executes a merging process to) the new group and the other groups. For example, when the group G02 and the group G03 shown in FIG. 4 have the same skew, that is, when the difference in arrival time of a clock signal from the clock source CS to a circuit element between the circuit elements 301 to 303 is zero, the group G02 and the group G03 are merged.

Figure 5:
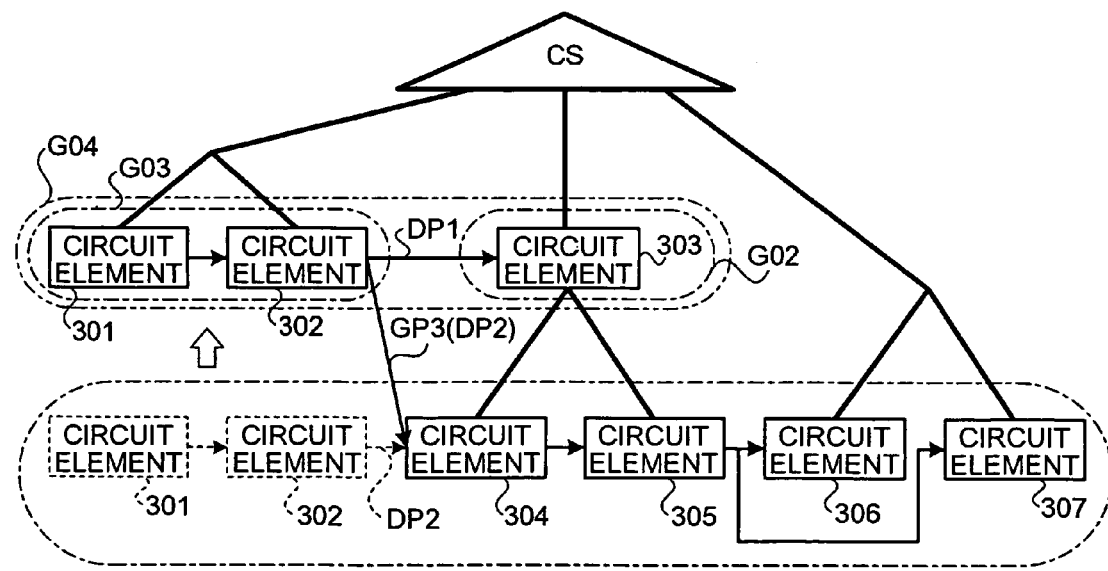
FIG. 5 is a diagram for explaining a merge process for groups.

FIG. 5 is a diagram for explaining a merge process for groups. A group G04 is a new group constructed by executing a merge process to the group G02 and the group G03.

The acquiring unit 201, the constructing unit 202, the analyzing unit 203, the outputting unit 204, and the determining unit 205 described above realize their functions by, more specifically, for example, execution by the CPU 101 of the programs recorded in the recording media such as the ROM 102, the RAM 103, the HD 105, etc. shown in FIG. 1, or by the I/F 109.

Figure 6:
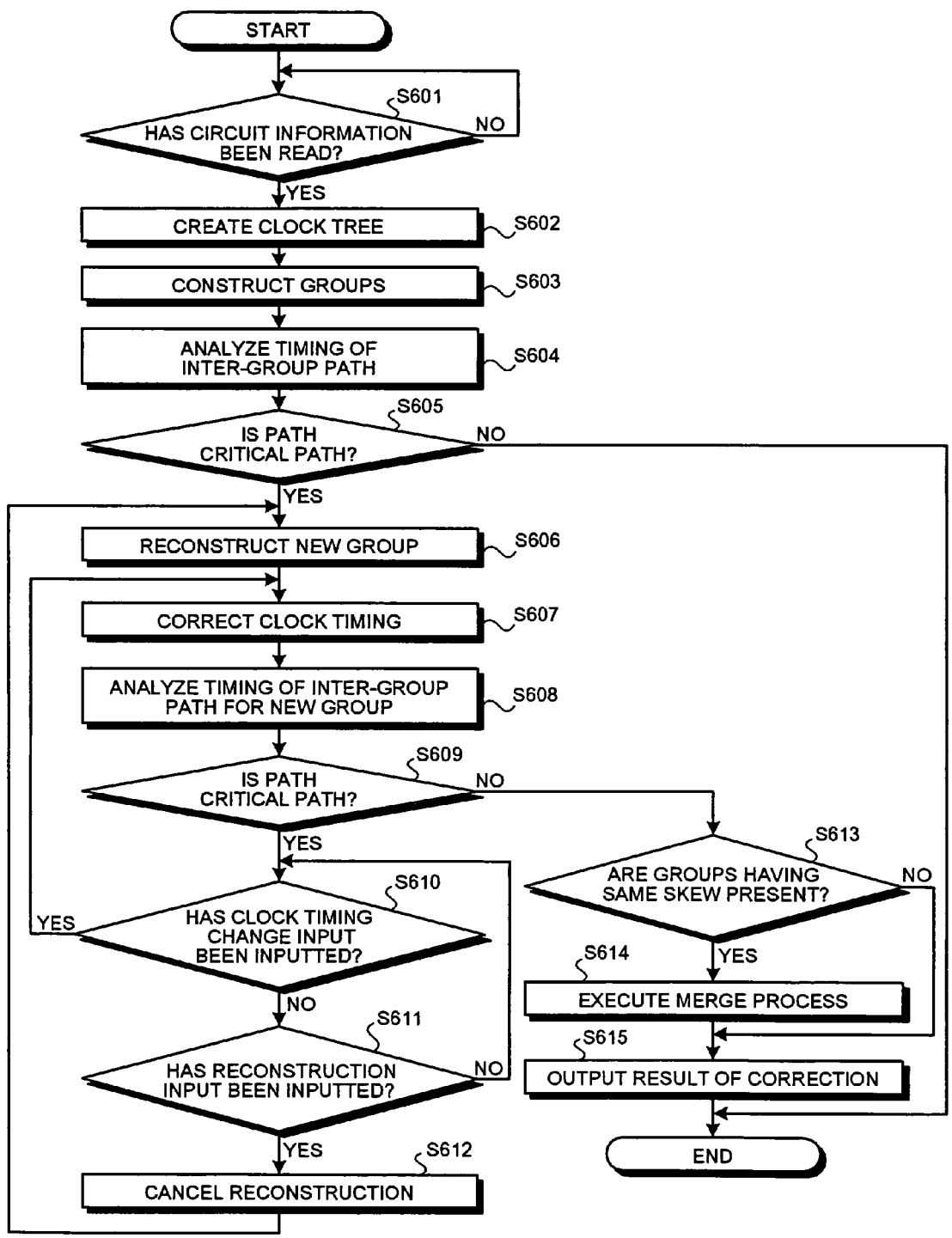
FIG. 6 is a flowchart of a design supporting process performed by the design supporting apparatus.
Figure 7:
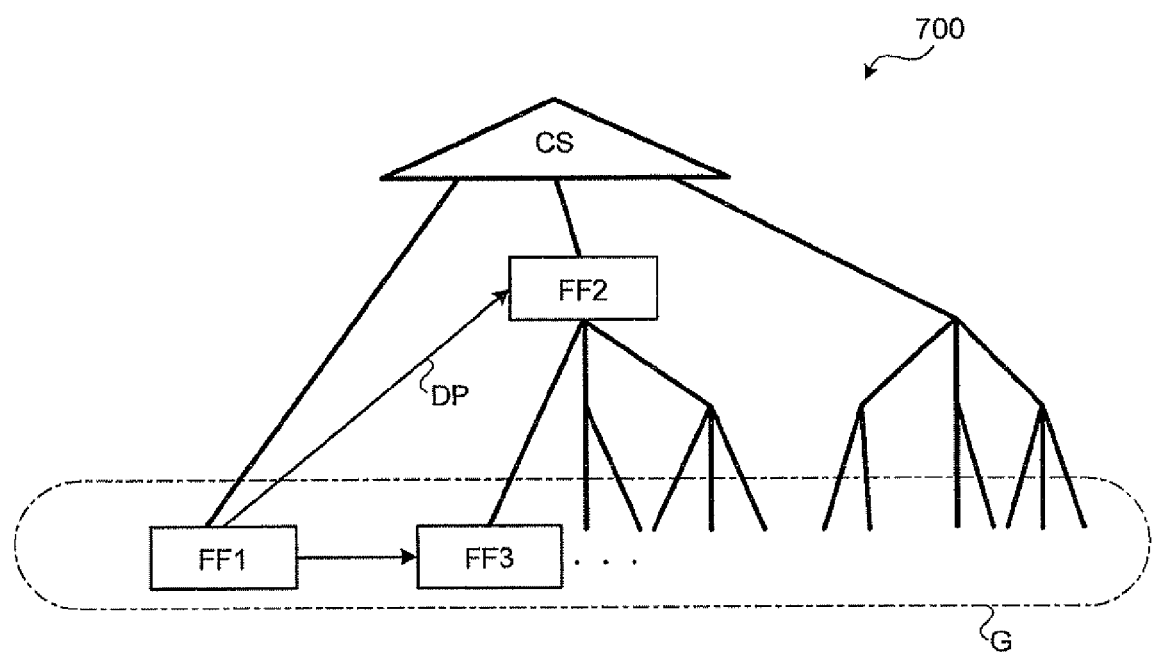
FIG. 7 is a diagram showing an example of a clock tree.

FIG. 6 is a flowchart of a design supporting process performed by the design supporting apparatus 200.

The design supporting apparatus 200 waits until the circuit information such as a net list or a timing restriction file of a circuit to be designed is read by the acquiring unit 201 (step S601: No), and when the circuit information has been read (step S601: Yes), the clock tree 300 of the circuit to be designed shown in FIG. 3 is created (step S602).

As shown in FIG. 3, the clock tree 300 is divided into groups (construction of groups) by the constructing unit 202 (step S603). The inter-group path GP1 is identified and a timing analysis of the inter-group path GP1 is executed by the analyzing unit 203 (step S604). Whether the inter-group path GP1 is a critical path is determined (step S605).

When the inter-group path GP1 is not a critical path (step S605: No), the timing restriction described in the timing restriction file in the circuit information is complied with and the series of process steps are ended. In this case, in the clock tree 300, whether the timing restriction is complied with is revealed when only the inter-group path GP1 is analyzed by the STA analysis. Therefore, increase of the speed of the analysis process and reduction of the time necessary for the analysis can be realized.

When the inter-group path GP1 is determined to be a critical path (step S605: Yes), a reconstruction of a group is executed by the constructing unit 202 (step S606). That is, as shown in FIG. 4, the group G11 is created by excluding the circuit element 302 and the circuit element 301 that is at the previous stage of the circuit element 302, from the group G01 that does not comply with the timing restriction among the groups G01 and G02 that have the circuit elements to be connected with the inter-group path GP1. A new group G03 is constructed with the excluded circuit elements 301 and 302.

Thereafter, the clock timing in the clock tree 300 is corrected by the analyzing unit 203 as necessary (step S607). This correction may be executed as an automatic correction process by the analyzing unit 203 set in advance or as a correction process by user operation.

A timing analysis of the inter-group path GP2 connected to the new group G03 is then executed (step S608). The inter-group path GP3 is the data path DP2 connected with the group G01 (group G11 in FIG. 4) from which the circuit elements 301 and 302 belonging to the new group G03 have been excluded. Therefore, the inter-group path GP3 is not a target of the analysis and the inter-group path GP2 alone is a target of the analysis. Thereby, even after reconstruction, increase of the speed of the analysis process and reduction of the time required for the analysis can be realized.

Whether any critical path is present is determined by the analysis process (step S609). That is, whether the inter-group path GP2 is a critical path is determined. When the inter-group path GP2 is a critical path (step S609: Yes), whether a clock timing change input has been inputted by user operation is determined (step S610).

When the clock timing change input has been inputted (step S610: Yes), the process is returned to step S607 and correction of the clock timing is executed. When no clock timing change input has been inputted (step S610: No), whether a reconstruction input has been inputted by user operation is determined (step S611). When no reconstruction input has been inputted (step S611: No), the process is returned to step S610.

When the reconstruction input has been inputted (step S611: Yes), the latest reconstruction is cancelled (step S612). That is, the group being constructed currently by the constructing unit 202 is returned to the group before the immediately-preceding timing analysis. The process is returned to step S606.

When no critical path is present (step S609: No), whether groups that have the same skew are present is determined (step S613). When groups that have the same skew as the groups G02 and G03 shown in FIG. 4 are present (step S613: Yes), the group G02 and the group G03 are merged by the constructing unit 202 (step S614) and a new group G04 is constructed. Thereby, the number of groups that have the same skew can be minimized and the result of the analysis can be automatically simplified. When no groups that have the same skew are present (step S613: No), the timing restriction file with corrected clock timing is outputted by the outputting unit 204 as the result of the correction (step S615).

As described above, by dividing the clock tree 300 into groups based on the skews, targets to be analyzed with the STA analysis can be screened to leave the inter-group paths that have high probabilities of error occurrence. When the timing restriction is also not complied with (a critical path is detected) even after the STA analysis, targets to be analyzed with the STA analysis can be screened to leave the new inter-group path by reconstruct the group. Therefore, points to be corrected can be easily grabbed.

Because any STA analysis covering all the paths needs not to be executed, increase of the speed of the STA analysis process can be realized. Because the skew adjustment can be executed after correcting the clock tree before arrangement and wiring, correction by ECO is unnecessary and the returned design after arrangement and wiring is reduced. Therefore, reduction of the load on the user in designing can be facilitated as well as reduction of the time necessary for designing can be facilitated.

According to the present invention, more efficient LSI designing and reduction of the time required for designing can be facilitated. The design supporting method described referring to the embodiment can be realized by executing programs prepared in advance on a computer such as a personal computer, a work station, etc. This program is recorded in a computer-readable recording medium such as a HD, a FD, a CD-ROM, an MO, a DVD, etc. and is executed by being read from the recording medium by a computer. This program may be in a form of a transmissible medium that can be distributed through a network such as the Internet, etc.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for supporting a design of a circuit, comprising:
    an acquiring unit that acquires a clock tree of the circuit;
    a constructing unit that constructs, based on the clock tree, a plurality of groups of elements in the circuit each of which includes a plurality of elements having same clock skew;
    an analyzing unit that performs an analysis of a timing of an inter-group path between a first group and a second group among the groups; and an output unit that outputs a result of the analysis, wherein:

the constructing unit further constructs, when the inter-group path is a critical path, a third group including at least one element connected with the inter-group path and excluded from the first group, and the analyzing unit performs an analysis of the timing of inter-group path between the third group and one of the other groups.

2. The apparatus according to claim 1, wherein the analysis is performed on inter-group path(s) between the third group and a group other than the first group.

3. The apparatus according to claim 1, wherein the constructing unit further merges the third group and one of the groups that includes elements having a common clock skew as the third group.

4. A method for supporting a design of a circuit, comprising:

acquiring a clock tree of the circuit;

constructing, based on the clock tree, a plurality of groups of elements in the circuit, each of which includes a plurality of elements having a common clock skew;

performing an analysis of timing of an inter-group path between a first group and a second group among the groups;

outputting a result of the analysis;

constructing, when the inter-group path is a critical path, a third group including at least one element connected with the inter-group path and excluded from a a first group; and performing an analysis of the timing of inter-group path(s) between the third group and one of the other groups.

5. The method according to claim 4, wherein the analysis is performed on inter-group path(s) between the third group and a group other than the first group.

6. The method according to claim 4, further comprising:

merging the third group and one of the other groups that includes elements having a common clock skew as the third group.

7. A computer-readable recording medium for supporting a design of a circuit, wherein the computer program causes the computer to execute:

acquiring a clock tree of the circuit;

constructing, based on the clock tree, a plurality of groups of elements in the circuit, each of which includes a plurality of elements having a common clock skew;

performing an analysis of timing of an inter-group path between a first group and a second group among the groups;

outputting a result of the analysis;

constructing, when the inter-group path is a critical path, a third group including at least one element connected with the inter-group path and excluded from the first group; and performing an analysis of the timing of an inter-group path between the third group and one of the other groups.

8. The computer-readable recording medium according to claim 7, wherein the analysis is performed on inter-group paths between the third group and groups other than the first group.

9. The computer-readable recording medium according to claim 7, further comprising merging the third group and one of the group that includes elements having a common clock skew as the third group.

* * * * *

UNITED STATES PATENT AND TRADEMARK OFFICE
CERTIFICATE OF CORRECTION

PATENT NO. : 7,406,672 B2 Page 1 of 1
APPLICATION NO. : 11/363215
DATED : July 29, 2008
INVENTOR(S) : Daisuke Fukuda It is certified that error appears in the above-identified patent and that said Letters Patent is hereby corrected as shown below:

Column 9, Line 30, change "a a" to --the--.

Signed and Sealed this

Twenty-fifth Day of November, 2008

JON W. DUDAS
*Director of the United States Patent and Trademark Office*